United States Patent [19]

Dodgen

[11] Patent Number: 4,620,335
[45] Date of Patent: Nov. 4, 1986

[54] LOWER BED STRUCTURE FOR A RECREATIONAL VEHICLE

[75] Inventor: John N. Dodgen, Fort Dodge, Iowa

[73] Assignee: Dodgen Industries, Inc., Humboldt, Iowa

[21] Appl. No.: 685,041

[22] Filed: Dec. 21, 1984

[51] Int. Cl.$^4$ .................. B60N 1/10; A47C 17/13; A47C 17/16
[52] U.S. Cl. ............................. 5/118; 5/20; 5/37 C; 5/47; 296/65 R; 296/69
[58] Field of Search .................. 5/118, 47, 4.8, 37 R, 5/37 B, 37 C, 20, 21; 296/65, 69

[56] References Cited

U.S. PATENT DOCUMENTS

| | | | |
|---|---|---|---|
| 3,140,114 | 7/1964 | Stephenson et al. | 5/118 |
| 3,282,625 | 11/1966 | Logan | 296/69 |
| 4,186,960 | 2/1980 | Mizzelle | 296/69 |
| 4,200,329 | 4/1980 | Inami et al. | 296/69 |
| 4,473,250 | 9/1984 | Truex et al. | 296/69 |
| 4,543,675 | 10/1985 | Shrock | 5/37 R |

FOREIGN PATENT DOCUMENTS

| | | | |
|---|---|---|---|
| 755474 | 11/1933 | France | 5/37 C |
| 958590 | 5/1964 | United Kingdom | 296/65 R |

*Primary Examiner*—Alexander Grosz
*Attorney, Agent, or Firm*—Zarley, McKee, Thomte, Voorhees & Sease

[57] ABSTRACT

A bed structure for a vehicle is provided and includes a plurality of interconnected elongated cushions, each having a forward edge, a rearward edge, and opposite sides, and a track assembly connected to each side wall of the vehicle for supporting the cushions adjacent their opposite ends. The cushions are movable along the track assembly between a first position, wherein a couch having a seat portion and a back rest is formed by the cushions and a second position wherein a substantially flat bed surface is formed by the cushions. The bed surface is the approximate size of a queen size bed. Each cushion includes a rigid base and a resilient pad mounted thereon, and are interconnected to one another to prevent sliding of the cushions in either the first couch position or the second bed position. Storage area is provided in the vehicle behind the couch and beneath the couch or bed surface.

2 Claims, 6 Drawing Figures

1

LOWER BED STRUCTURE FOR A RECREATIONAL VEHICLE

BACKGROUND OF THE INVENTION

Vans and recreational vehicles having bed structures therein are well known. Typically, such conventional bed structures can be moved from a first position wherein a couch is provided to a second position wherein a flat bed surface is provided. However, the bed surface is usually narrow and does not provide sufficient room for two people to lay on. Another problem associated with such bed structures is that the cushions or pads which comprise the seat and back rest of the couch often slide apart in both the first couch position and the second bed position such that gaps between the pads exist. Also, conventional bed structures have little, if any, storage behind the couch and minimal storage beneath the couch.

Therefore, a primary objective of the present invention is the provision of an improved bed structure for a van or recreational vehicle.

A further objective of the present invention is the provision of a bed structure for a van or recreational vehicle which provides a bed surface sufficiently large for two people to sleep comfortably.

Another objective of the present invention is the provision of a bed structure which folds from a couch to a queen size bed.

Still another objective of the present invention is the provision of a bed structure for a vehicle with increased storage area behind and below the structure.

A further objective of the present invention is the provision of a bed structure having cushions which will not slide with respect to one another when formed into a couch or into a bed surface.

A further objective of the present invention is the provision of a bed structure which is economical to manufacture, easy to move from one position to another, and durable in use.

SUMMARY OF THE INVENTION

The bed structure of the present invention includes a track assembly connected to each of the side walls of a vehicle and a plurality of interconnected, elongated cushions being supported by the track members at the opposite sides of each cushion. The cushions are movable along the track assembly between a first position wherein a couch having a seat portion and a back rest is formed and a second position wherein a substantially flat bed surface is formed by the cushions.

More particularly, the bed structure includes three cushions, the first of which forms the seat portion of the couch and the second of which forms the back rest of the couch. The first and second cushions are interconnected by an arm which permits sliding movement of the second cushion with respect to the first cushion, while the second and third cushions are connected by a hinge.

The track assembly at each side wall of the vehicle includes a first bracket member having an aperture therein for maintaining the first cushion in the selected first or second position, a second bracket member having an arcuate slot therein for guiding the second cushion between the first and second positions, and a third bracket member having a horizontally disposed slot therein for guiding the third cushion between the two positions. A short peg projecting from the first cushion is received within the aperture of the first bracket member when the cushions are in the first couch position while a second short peg projecting from the first cushion is received in the same aperture of the first bracket member when the cushions are in the second bed position. The second cushion has a finger at each side thereof which is slidably received within the slot of the respective second bracket member. The third cushion also has a finger at each end thereof which is slidably received within the slot of the respective third bracket member.

Each cushion is comprised of a rigid base and a resilient pad mounted on the base. Storage is provided behind the couch when the cushions are in the first position and storage is provided beneath the structure when the cushions are in either the first or second position.

DETAILED DESCRIPTION OF THE DRAWINGS

Figure 1:
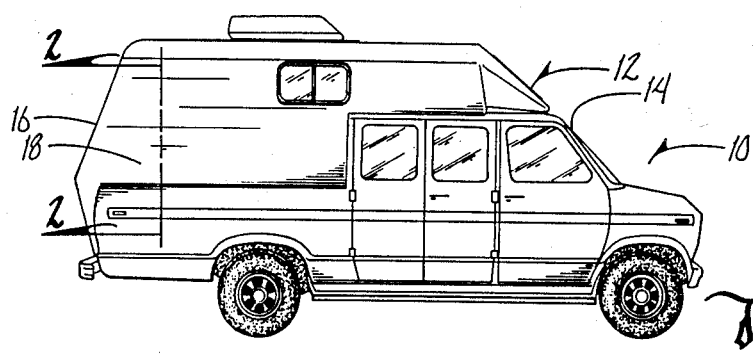
FIG. 1 is a side elevational view of a recreational vehicle.
Figure 2:
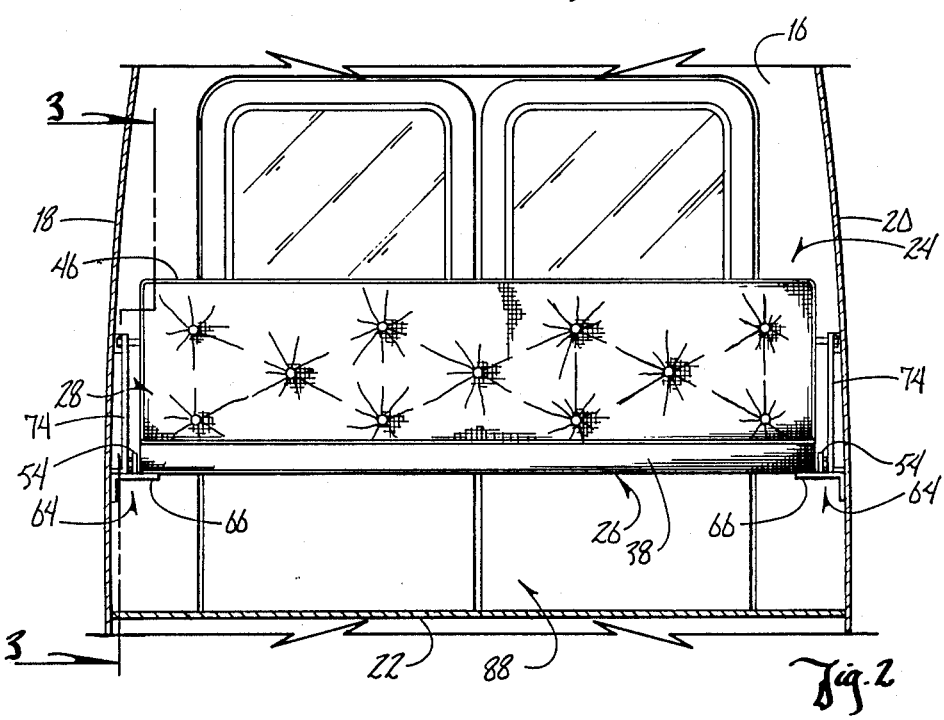
FIG. 2 is a sectional front elevational view taken along lines 2—2 of FIG. 1, showing the bed structure of the present invention as mounted within the recreational vehicle.

In the drawings, a vehicle such as a van or recreational vehicle (RV) is generally designated by the reference numeral 10. As seen in the drawings, RV 10 is provided with a topper unit 12, however, such topper unit is not necessary for the bed structure of the present invention. RV 10 includes a forward end 14, a rearward end 16, opposite side walls 18 and 20, and a floor 22.

The bed structure of the present invention is generally designated by the reference numeral 24. Bed structure 24 includes a first cushion 26, a second cushion 28, and a third cushion 30. Each cushion 26, 28 and 30 is elongated and has opposite sides 32, 34 and 36, respectively. Also, each cushion 26, 28 and 30 has a forward edge 38, 40 and 42, respectively, and a rearward edge 44, 46 and 48, respectively. Each cushion 26, 28 and 30 is comprised of a rigid base member 50 and a resilient pad 52 secured to base member 50.

First cushion 26 is connected to second cushion 28 at the opposite sides thereof by an arm 54 which is rigidly secured to cushion 26 by a connecting means such as a bolt 56 adjacent the rearward side 32 of cushion 26. Arm 54 includes a horizontally disposed slot 58 therein through which a bolt or other finger member 60 projecting from the forward side 40 of second cushion 28 slidably extends. The movement of finger member 60 within slot 58 of arm 54 will be described hereinafter. A hinge 62 foldably connects rearward edge 46 of second cushion 28 to forward edge 42 of third cushion 30.

Bed structure 24 of the present invention also includes a track assembly, generally designated in the drawings by the reference numeral 64. Track assembly 64 is identical at each side wall 18 and 20 of RV 10 and therefore a description with respect to only one side wall will be provided.

Track assembly 64 includes a first L-shaped bracket member 66 which is connected to the side wall of RV 10 in any convenient manner, such as welding or the like. First bracket member 66 includes an aperture 68 therein adapted to receive a first peg 70 or a second peg 72 attached to base 50 of first cushion 26.

Track assembly 64 further includes a second bracket member 74 which is connected at its opposite ends to the side wall of vehicle 10 in any convenient manner, such as welding or the like. Second bracket member 74 has an arcuate slot 76 therein adapted to slidably receive a bolt or finger 78 extending outwardly from side 34 of second cushion 28.

Track assembly 64 also includes a third bracket member 80 having a horizontally disposed slot 82 therein. Slot 82 is adapted to receive a finger 84 extending outwardly from the rearward side 36 of third cushion 30.

Figure 3:
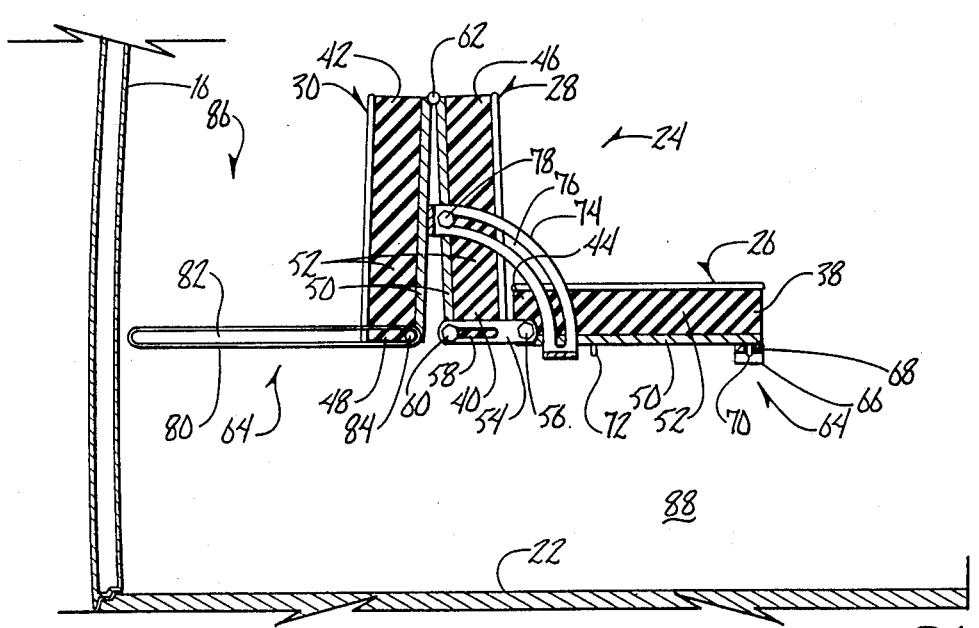
FIG. 3 is a sectional side elevational view taken along lines 3—3 of FIG. 2, showing the bed structure in the first position wherein a couch is formed.
Figure 4:
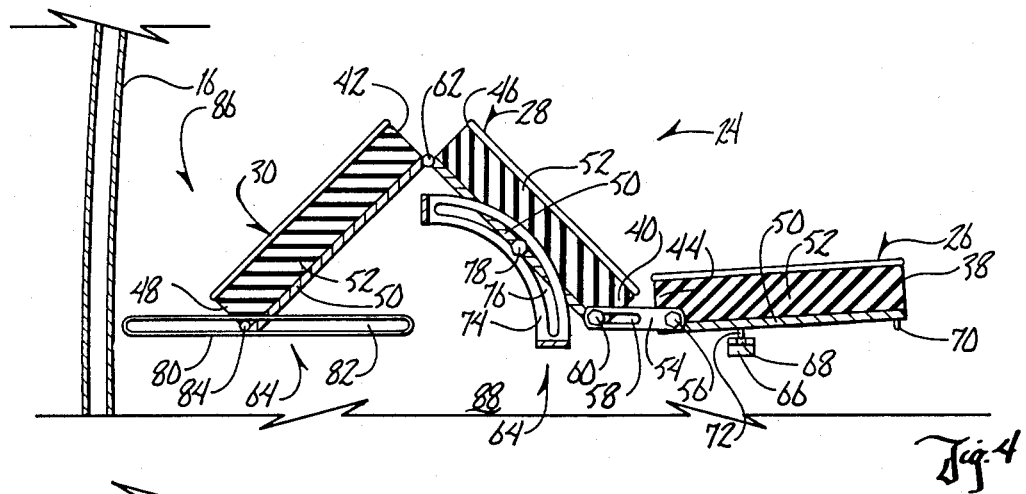
FIG. 4 is a view similar to that of FIG. 3 showing the bed structure in a position approximately midway between the first couch position and the second bed position.
Figure 5:
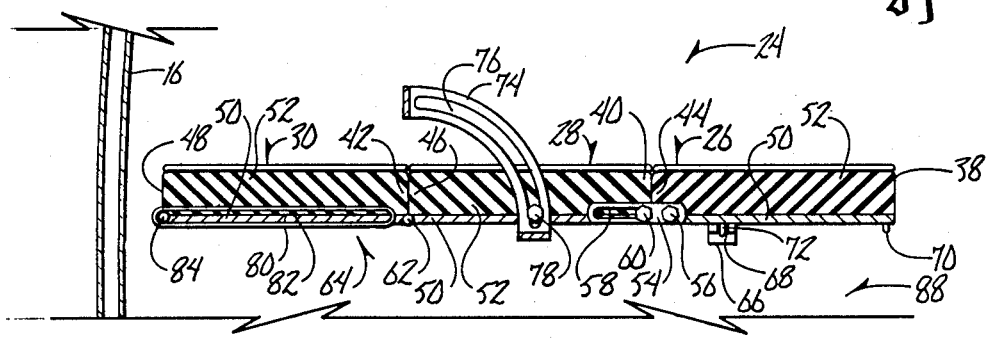
FIG. 5 is a view similar to that of FIG. 3 showing the bed structure folded down into the second position wherein a flat bed surface is provided.
Figure 6:
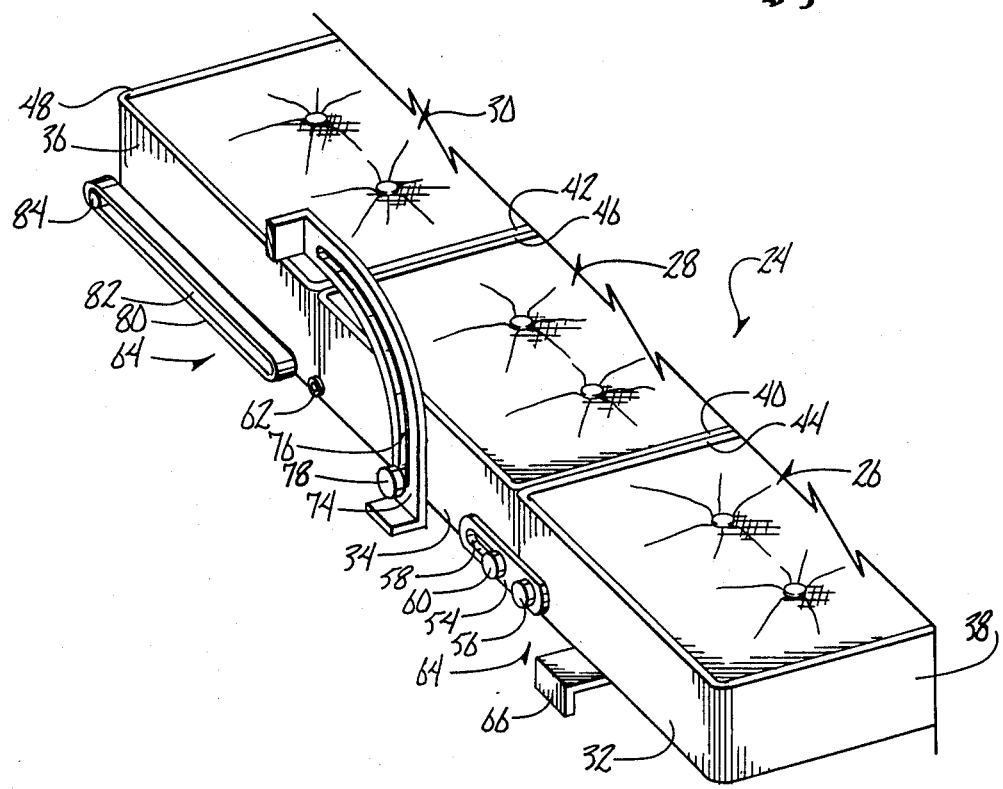
FIG. 6 is a partial perspective view of the bed structure of the present invention.

As seen in FIGS. 3-5, cushions 26, 28 and 30 of bed structure 24 can be folded between a first position wherein a couch is provided (FIG. 3) and a second position wherein a substantially flat bed surface is provided (FIG. 5). In the first position, first cushion 26 provides the seat portion of the couch while second cushion 28 provides the back rest of the couch. In the second bed position, all three cushions provide a surface upon which one or two people may sleep with the approximate dimensions of a queen sized bed.

As seen in FIG. 3, first peg 70 on first cushion 26 is received within aperture 68 of first bracket member 66 to rigidly maintain bed structure 24 in the first position. In the first position, finger 60 of second cushion 28 is in the rearward portion of slot 58 of arm 54, finger 78 of cushion 28 is adjacent the rearward upper end of arcuate slot 76 of second bracket member 74, and finger 84 of third cushion 30 is adjacent the forward end of slot 82 of third bracket member 80, as seen in FIG. 3.

To move bed structure 24 from the first position to the second position, first cushion 26 is lifted to withdraw first peg 70 from aperture 68 in first bracket member 66. First cushion 26 can then be moved forwardly such that arm 54 pulls forward edge 40 of second cushion 28 forwardly while finger 78 of second cushion 28 simultaneously moves forwardly and downwardly within slot 76 of second bracket member 74. As forward edge 40 of second cushion 28 is moving forwardly, rearward edge 46 of cushion 28 is moving downwardly accordingly, along with forward edge 42 of third cushion 52. Also, as forward edge 42 of cushion 52 moves downwardly, rearward edge 48 of cushion 52 moves rearwardly as guided by finger 84 within slot 82 of third bracket member 80. As rearward edge 46 of second cushion 28 moves downwardly, forward edge 40 thereof moves forwardly with respect to slot 58 of arm 54 until the three cushions are substantially coplanar, as seen in FIG. 5, at which point second peg 72 on base 50 of first cushion 26 is received within aperture 68 of first bracket member 66 to rigidly maintain bed structure 24 in the second position.

To move bed structure 24 from the second position to the first position, the above procedure is reversed.

As seen in FIG. 3, a storage area 86 is provided in vehicle 10 behind the couch when bed structure 24 is in the first couch position. The area between side walls 18 and 20 at the rear of vehicle 10 is open except for the short distance which third bracket members 80 project inwardly from the respective side walls. A second storage area 88 is provided beneath bed structure 24 when the structure is in either the first couch position or the second bed position.

From the foregoing, it can be seen that the bed structure for a vehicle of the present invention accomplishes at least all of the stated objectives.

What is claimed is:

1. A bed structure for a vehicle having forward and rearward ends and opposite side walls, said bed structure comprising:

a plurality of interconnected elongated cushions each having a forward edge, a rearward edge, and opposite sides; and a track means connectible to each of said side walls of said vehicle for supporting said cushions adjacent said opposite sides thereof;

said cushions being movable along said track means between a first position wherein a couch is formed by said cushions and a second position wherein a substantially flat bed surface is formed by said cushions;

said plurality of cushions including a first cushion, a second cushion and a third cushion;

each of said track means including a first bracket member for maintaining said first cushion in said first or second position, a second bracket member for guiding said second cushion between said first and second positions, and a third bracket member for guiding said third cushion between said first and second positions; and said first bracket member having an aperture therein and said first cushion having a first peg which is received in said aperture of said first bracket member when said plurality of cushions are in said first position and a second peg which is received in said aperture of said first bracket member when said plurality of cushions are in said second position.

2. A bed structure for a vehicle having forward and rearward ends and opposite side walls, said bed structure comprising:

a plurality of interconnected elongated cushions each having a forward edge, a rearward edge, and opposite sides; and a track means connectible to each of said walls of said vehicle for supporting said cushions adjacent said opposite sides thereof;

said cushions being movable along said track means between a first position wherein a couch is formed by said cushions and a second position where a substantially flat bed surface is formed by said cushions;

said plurality of cushions including a first cushion, a second cushion and a third cushion;

each of said track means including a first bracket member for maintaining said first cushion in said first or second position, a second bracket member for guiding said second cushion between said first and second positions, and a third bracket member for guiding said third cushion between said first and second positions; and said second bracket member having an arcuate slot therein and said second cushion having a finger slidably received within said arcuate slot so as to provide guided movement of said second cushion between said first and second positions.

* * * * *